3,297,783
VINYL HALIDE RESIN PLASTICIZED WITH A LINEAR COPOLYMER OF A DIEPOXIDE WITH A 1,2-ALKYLENE OXIDE
Frederick E. Bailey, Jr., Charleston, W. Va., assignor to Union Carbide Corporation, a corporation of New York
No Drawing. Filed Nov. 16, 1962, Ser. No. 238,261
15 Claims. (Cl. 260—836)

This invention relates to plasticized and stabilized vinyl halide resin compositions and to a process for their preparation. In one aspect, this invention is directed to vinyl halide resin compositions having incorporated therein an alkylene oxide polymer.

A major shortcoming of externally-plasticized, flexible vinyl halide resin compositions, e.g., poly(vinyl chloride), is their high temperature processing requirements which tend to limit their application in certain fields. Moreover, many of the vinyl halide resins are further restricted in their use due to inadequate heat and light stability. Fabricators of so-called plasticized vinyls have long sought an economical plasticizer whereby processing equipment could be utilized at lower operating temperatures. Additionally, a stabilizer which would increase the heat and light stability of the vinyl halide resins would permit higher use temperature as well as increased stability of the finished product where exposure to light is likely to be encountered. Some progress in this direction has been made by the combined use of conventional plasticizers and heat and light stabilizers. For instance, relatively high molecular weight butadiene-acrylonitrile rubbers have been utilized as plasticizers but shortcomings in color, clarity, resistance to oxidative attack, light stability, and processing characteristics have limited the use and effectiveness of these rubbers in flexible vinyl compositions. Likewise, relatively high molecular weight, viscous, liquid polyesters have met with some success, but difficulties in handling these viscous polyesters, and high cost, have placed limitations on their use. Similarly, the use of a separate heat and light stabilizer in addition to the plasticizer has not been without its economical or technological disadvantages.

Accordingly, one or more of the following objects will be achieved by the practice of the instant invention. It is an object of this invention to provide novel plasticized and stabilized vinyl halide compositions which exhibit a combination of properties not heretofore obtainable in polymeric compositions. Another object of this invention is to provide novel plasticized and stabilized vinyl halide resin compositions which have the combined characteristics of low temperature processing requirements, and heat and light stability. Another object is to provide poly(vinyl halide) compositions which have been both plasticized and stabilized by the admixture therewith of but a single additive. A still further object of this invention is to provide poly(vinyl halide) compositions which have been plasticized and stabilized with an alkylene oxide polymer. Another object of this invention is to provide a process for preparing the aforementioned plasticized compositions. These and other objects will readily become apparent to those skilled in the art in the light of the teachings herein set forth.

In a broad aspect, the invention contemplates the preparation of novel plasticized and stabilized vinyl halide resin compositions, both the plasticizer, stabilizer and the vinyl halide resin compositions being described in detail hereinafter. These novel plasticized and stabilized vinyl halide resin compositions, especially the novel plasticized poly(vinyl chloride), exhibit a combination of highly desirable properties which heretofore have been unattainable in vinyl resin compositions by the use of a single additive. The novel plasticized vinyl halide resin compositions exhibit vastly superior and highly outstanding low temperature processing ability and an unexpectedly high degree of heat and light stability. Excellent flexibility at low temperatures, i.e., below 0° C., and good brittle temperatures as low as 50° C., and lower, also are characteristics of the novel plasticized vinyl halide resin compositions. In addition, these novel plasticized compositions exhibit very low volatility, extremely high resistance to oil extraction, excellent color and processability, and superior resistance to straining. The combination of the above exemplified, unexpected and unobvious characteristics possessed by the novel plasticized and stabilized vinyl halide resin compositions stand in marked contrast to resin compositions plasticized with conventional plasticizers, e.g., dioctyl phthalate, and stabilized with conventional heat and light stabilizers. Moreover, the combination of highly favorable and superior properties which accrue when plasticizing, for example, poly(vinyl chloride), with the plasticizers contemplated by the invention is not achieved when plasticizing the same system with the corresponding relatively low molecular weight plasticizers.

The plasticizers and stabilizers contemplated in the invention are high molecular weight solid, linear copolymers of various monoepoxides and diepoxides having pendant epoxy groups along the polymer chain. It is unique that the same alkylene oxide polymer, i.e., the copolymer of a monoepoxide and a diepoxide, imparts both plasticizing and stabilizing properties to the vinyl resin. When admixed with a vinyl resin, the linear polymeric polyether chain is believed to function as a plasticizer while the pendant epoxy groups of the same molecule serve to stabilize the resin from heat and light degradation.

The alkylene oxide polymers are prepared from 1,2-alkylene oxides and diepoxide monomers. The 1,2-alkylene oxides can be further characterized by the following formula:

(I) 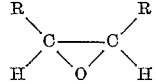

wherein each R, individually, can be hydrogen or a hydrocarbon radical free from ethylenic and acetylenic unsaturation such as, for example, alkyl, aryl, cycloalkyl, aralkyl, or alkaryl radicals. In addition, both R variables can be alkylene radicals which together with the epoxy carbon atoms, i.e., the carbon atoms of the epoxy group,

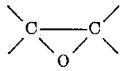

form a saturated cycloaliphatic hydrocarbon nucleus containing from 4 to 10 carbon atoms, preferably from 4 to 8 carbon atoms, for example, cycloalkyl, alkyl-substituted cycloalkyl, cyclobutyl, cyclopentyl, cyclohexyl, cycloheptyl, cyclooctyl, 2-methylcyclopentyl, 3-amylcyclohexyl, and the like. Illustrative R radicals include, among others, methyl, ethyl, propyl, butyl, isobutyl, hexyl, isohexyl, 3-propylheptyl, dodecyl, octadecyl, phenyl, benzyl, tolyl, ethylphenyl, butylphenyl, phenylethyl, phenylpropyl, cyclopentyl, cyclohexyl, 2-methylcyclohexyl, cycloheptyl, and the like. It is to be understood, also, that the term "lower 1,2-alkylene oxides" designates that each R variable of the above-depicted structural formula can be satisfied by hydrogen or lower alkyl, e.g., methyl, ethyl, propyl, isobutyl and the like.

Representative 1,2-alkylene oxide monomers which can be employed include, for example, ethylene oxide, propylene oxide, 1,2-butylene oxide, 2,3-butylene oxide, the epoxypentanes, the epoxyhexanes, 2,3-epoxyheptane, nonene oxide, 5-butyl-3,4-epoxyoctane, 1,2-epoxydodecane, 1,2-epoxyhexadecane, 1,2-epoxyoctadecane, 5-benzyl-2,3-epoxyheptane, 4-cyclohexyl-2,3-epoxypentane, styrene oxide, ortho-, meta-, and para-ethylstyrene oxide, the oxabicycloalkanes, e.g., 7-oxabicyclo[4.1.0]heptane, 6-oxabicyclo[3.1.0]hexane, 4-propyl-7-oxabicyclo-[4.1.0] heptane, 3-amyl-6-oxabicyclo[3.1.0]hexane and other alkyl-substituted oxabicycloalkanes, and the like.

A distinguishing feature of the copolymeric material is that one of the monomers from which the copolymers are prepared has epoxide groups of different reactivity in polymerization. In addition, the copolymers can contain one or more 1,2-alkylene oxides and/or diepoxide monomers chemically combined therein which can vary over a wide range. Preferably the copolymer can contain from about 2, and lower, to about 98 and higher, of either the 1,2-alkylene oxide or the diepoxide monomer therein, based on the total weight of said 1,2-alkylene oxide(s) and diepoxide monomer(s). The preferred copolymers contain a major proportion by weight of 1,2-alkylene oxide and a minor proportion by weight of diepoxide monomer, based on the total weight of 1,2-alkylene oxide and diepoxide monomer. Those copolymers which contain at least 50 weight percent of 1,2-alkylene oxide, e.g., ethylene oxide, propylene oxide, the epoxybutanes, and the like, based on the weight of said polymer, are highly preferred. Those copolymers which contain at least about 50 to about 98 weight percent 1,2-alkylene oxide and from about 50 to about 2 weight percent diepoxide monomer are eminently preferred.

The diepoxide monomers contemplated for use in preparing the copolymers can be characterized as those having two epoxide groups of different reactivity in polymerization. In general, a marked difference in reactivity will exist when one of the epoxide groups is in a terminal position in the molecule while the remaining epoxide group is in an internal position. By the phrase "terminal epoxide groups," as used throughout the specification and appended claims, is meant the group

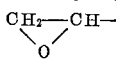

Additionally, by the phrase "internal epoxide group" as used throughout the specification and appended claims is meant the group

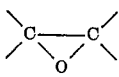

wherein each epoxy carbon atom contained in the group has no more than one hydrogen atom attached thereto.

In general, the diepoxides suitable for use can be further characterized by the following formula:

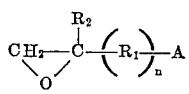

wherein $R_2$ represents hydrogen or lower alkyl, e.g., methyl, ethyl, propyl and the like; $R_1$ represents a divalent saturated aliphatic hydrocarbon radical containing at least one carbon atom; $n$ is an integer of 0 or one; and A represents epoxyalkyl, epoxyalkoxy, epoxyacyloxy, epoxycycloalkyl, alkylepoxycycloalkyl, epoxyalkylcycloalkyl, epoxycycloalkoxy, epoxycycloalkylalkoxy, epoxycycloalkylaryloxy, epoxyalkylaryloxy, epoxyalkylaryl, and the unit

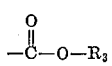

wherein $R_3$ can be epoxyalkyl or epoxycycloalkylalkyl with the proviso that the epoxy group in A is not in a terminal position as hereinabove defined.

Illustrative radicals for $R_1$ include, for example, methylene, ethylene, propylene, butylene, 2-methylbutylene, hexylene, octylene, 2,4-dimethyloctylene, 3-propylheptyl-ene, ethylidene, propylidene, butylidene, isopentylidene, octylidene, and the like. It is preferred that $R_1$ be a lower alkylene or alkylidene radical, i.e., methylene, propylene, butylene, ethylidene, butylidene, and the like. Representative radicals for A include, among others, 2,3-epoxybutyl, 2,3-epoxyhexyl, 3-propyl-4,5-epoxyheptyl, 2,3-epoxybutanoyloxy, 2,3-epoxyhexanoyloxy, 2,3-epoxyoctanoyloxy, 3,4-epoxypentanoyloxy, 4,5-epoxyhexanoyloxy, 9,10-epoxyoctadecanoyloxy, 9,10-epoxyundecanoyloxy, 3,4-epoxycyclohexylcarbonyloxy, 2,3-epoxycyclopentylcarbonyloxy, 2,3-epoxybutoxy, 2,3-epoxypentoxy, 4,5-epoxyhexoxy, 2-ethyl-3,4-epoxyoctoxy, 6,7-epoxydecoxy, 3,4-epoxycyclohexylmethoxy, 2,3-epoxycyclopentylmethoxy, 2,3-epoxypentylethoxy, 3,4-epoxycyclohexyloxy, 2,3-epoxycyclopentyloxy, 3,4-epoxycycloheptyloxy, ortho-, meta-, and para-(2,3-epoxybutyl)phenyl, 2,3-epoxybutyltolyl, and the like.

Illustrative diepoxide monomers which can be employed include, for example, the diepoxide alkanes, e.g., 1,4-hexadiene dioxide, 1,4-heptadiene dioxide, 1,5-heptadiene dioxide,, 1,4-octadiene dioxide, 1,5-octadiene dioxide, 1,6-octadiene dioxide, 1,4-nonadiene dioxide, 1,5-nonadiene dioxide, 1,7-nonadiene dioxide, 1,4-dodecadiene dioxide, 1,10-dodecadiene dioxide, 1,10 octadecadiene dioxide, 1,-12-eicosadiene dioxide, 3-methyl-1,4-hexadiene dioxide, 4-propyl-1,5-octadiene dioxide, and the like; the diepoxide cycloalkanes, e.g., dipentene dioxide, vinylcyclohexene dioxide and the like; diepoxide alkanoates, e.g., 2,3-epoxypropyl 3,4-epoxypentanoate,
2,3-epoxypropyl 3,4-epoxyhexanoate,
2,3-epoxypropyl 2,3-epoxy-2-ethyl hexanoate,
2,3-epoxypropyl 2,3-epoxybutanoate,
3,4-epoxybutyl 2,3-epoxybutanoate,
3,4-epoxybutyl 4,5-epoxyhexanoate,
4,5-epoxypentyl 7,8-epoxynonanoate,
2,3-epoxybutyl 4,5-epoxybutanoate,
3,4-epoxypentyl 7,8-epoxyoctanoate,
2,3-epoxypropyl 3,4-epoxycyclohexanecarboxylate,
3,4-epoxybutyl 3,4-epoxy-6-methylcyclohexanecarboxylate,
3,4-epoxycyclohexyl 4,5-epoxypentanoate, and the like;

the diepoxide ethers, e.g., 2,3-epoxybutyl glycidyl ether,
2,3-epoxybutyl methylglycidyl ether,
2,3-epoxypentyl glycidyl ether,
3,4-epoxyhexyl glycidyl ether,
7,8-epoxynonyl 3,4-epoxybutyl ether,
2,3-epoxycyclopentyl glycidyl ether,
2,3-epoxycyclohexylmethyl glycidyl ether,
para-(2,3-epoxycyclopentyl)phenyl glycidyl ether, and the like. It should be noted that while the aforesaid diepoxide monomers are preferred, other monomers which have epoxide groups of different reactivity also can be employed in the preparation of the copolymers. Moreover, the 1,2-alkylene oxide itself must, of necessity, have a reactivity in polymerization greater than the lesser reactive epoxy group of the diepoxide monomer. Otherwise the copolymer will consist largely of homopolymerized diepoxide monomer or highly cross-linked polymer.

In contrast to the diepoxides which contain oxirane oxygens having different degrees of reactivity in polymerization, the use of diepoxides having two equally reactive oxirane oxygens, e.g., butadiene monoxide, results in a highly cross-linked polymer and are thus less preferred. Furthermore, it has been observed that when the copolymer is comprised of a major amount of lower 1,2-alkylene oxide, e.g., ethylene oxide, the resulting product is a linear copolymer with little or no cross-linking occurring through the less reactive pendant epoxy groups.

The copolymers employed as plasticizers and stabilizers in this invention can be prepared by contacting the aforementioned monomers, i.e., 1,2-alkylene oxide(s) and diepoxide monomers(s), with a catalytically significant quantity of certain divalent metal carbonates, alkaline earth metal alcoholates, organometallic compounds, or amides described hereinafter.

The divalent metal carbonate catalysts are the carbonates of divalent metals which have an atomic number greater than 11 and which are found below potassium and above tin in the Electromotive Force Series of Elements [1]. These divalent metals include magnesium, calcium, strontium, barium, zinc, cadmium, iron, cobalt, nickel, chromium and manganese. Particularly preferred metal carbonates, from the standpoint of increased catalytic activity and/or ease of preparation in pure form, are the Group IIA metal carbonates, i.e., the calcium, strontium, or barium carbonates; Group IIB metal carbonates, i.e., the zinc or cadmium carbonates, manganous carbonate; and magnesium carbonate.

In addition to the above-enumerated divalent metal carbonates, it is also observed that the trivalent metal carbonates of the lanthanide series, i.e., rare earth metals, can be employed as catalysts in the instant invention.

It has been observed that the divalent metal carbonates should contain an amount of sorbed water, i.e., adsorbed or absorbed water, which is sufficient to significantly activate or to impart significant catalytic activity to said metal carbonates. The phenomenon regarding sorbed water contained by metal carbonates is not entirely understood at this time nor is it the desire of the inventor to be bound by any theories regarding adsorption or absorption phenomena. It is suffice to say that the sorbed water contained by the metal carbonate is firmly tied thereto such that air-drying the metal carbonate for several days at room temperature or slightly above room temperature does not result in any essential weight loss of the sorbed water content in the metal carbonate. The sorbed water bound to the metal carbonates stand in contradistinction to a physical mixture of water and metal carbonate, e.g., an aqueous slurry of metal carbonate, in which latter case the water can be considered to be extraneous water or non-sorbed water. Thus, air-drying a physical mixture of water and metal carbonate results in the removal of the extraneous water or non-sorbed water content from said mixture.

The optimum amount of sorbed water to be contained by the metal carbonates is a natural limit and is governed to a great extent, by various factors such as the particular metal carbonate contemplated, the method by which the metal carbonate was prepared, the surface area and sorptive characteristics of the metal carbonate, the operative conditions of the polymerization reaction, and other considerations. In general, the greater the surface area of the metal carbonate, the greater the amount of water which can be adsorbed and/or absorbed. As is readily understood, the more hydrophilic metal carbonates, e.g., zinc carbonate, tend to hold greater amounts of sorbed water than those metal carbonates in which the hydrophilic characteristics are slight, e.g., strontium carbonate.

The metal carbonates suitable as catalysts can be prepared by reacting the corresponding divalent metal salt, e.g., the divalent metal chloride, cyanide, and acetate, with sodium carbonate, or other soluble carbonates, and subsequently recovering the resulting divalent metal carbonate precipitate. When the hydroxide of the divalent metal is soluble, the divalent metal carbonate can be obtained as a precipitate by bubbling carbon dioxide into an aqueous solution containing the soluble divalent metal hydroxide.

The second class of catalysts contemplated to produce the alkylene oxide polymers are the alkaline earth metal alcoholates. The term "exposure-activated" alkaline earth metal alcoholates will be employed in this specification,

---

[1] Handbook of Chemistry and Physics, 38th edition, p. 1660; published by Chemical Rubber Co., Cleveland, Ohio.

including the appended claims to designate those alkaline earth metal alcoholates which have been exposed to (contacted with) water and carbon dioxide according to the teachings herein set forth. The alkaline earth metal alcoholates are compounds containing alkaline earth metal, i.e., strontium, calcium, or barium, in which the metal portion is bonded to mono- or polyhydroxy organic compounds, e.g., alkanols, cycloalkanols, alkylene glycols, or phenols, through the hydroxy oxygen of at least one of the hydroxy groups of said organic compound. Expressed differently, the alkaline earth metal alcoholates can be characterized by the following formula:

(I) $$RO-M-OR$$

wherein M is an alkaline earth metal, i.e., strontium, calcium or barium; and wherein each R variable can be considered to be derived from the same or different mono- or polyhydroxy organic compounds. It is to be understood, of course, that when R is a polyhydroxy organic compound, each M valence also can be separately bonded through two different hydroxy oxygens of the same R moiety, i.e.,

in which case R also may or may not have free hydroxyl groups (—OH) attached thereto.

The organic portion of the alkaline earth metal alcoholates can be derived, for example, from primary, secondary, and tertiary alkanols and cycloalkanols, e.g., methanol, ethanol, n-propanol, isobutanol, n-pentanol, isopentanol, n-hexanol, dodecanol, 2-ethylhexanol, 2,2-dimethyloctanol, benzyl alcohol, 2-phenylethanol, diphenylcarbinol, pentaerythritol, cyclopentanol, cyclohexanol, 4-butylcyclohexanol, 3-octylcyclopentanol, cycloheptanol, and the like; from mono- and polyalkylene glycols, e.g., ethylene glycol, propylene glycol, the butanediols, the pentanediols, 2-methyl-2,3-butanediol, 2-ethyl-1,6-hexanediol, 4,5-octanediol, 1,9-nonanediol, glycerol, β-methylglycerol, diethylene glycol, dipropylene glycol, dibutylene glycol, dipentylene glycol, dihexylene glycol, and the like; from monoalkyl and monoaryl ethers of mono- and polyalkylene glycols, e.g., 2-methoxyethanol, 2-ethoxyethanol, 2-butoxyethanol, 2-benzyloxyethanol, 3-propoxypropanol, 4-hexoxybutanol, 6-benzyloxyhexanol, 2-(β-methoxyethoxy)ethanol, 2-(β-butoxyethoxy)ethanol, 3-(β-ethoxypropoxy)propanol, 4-(β-hexoxybutoxy)butanol, and the like; from mono- and polyhydroxy-containing aromatic and polyaromatic (including fused aromatic) hydrocarbons, e.g., phenol, resorcinol, catechol, pyrogallol, the cresols, alkyl-substituted phenol, the xylenols, 2,2'-, 2,4'-, 3,3'-, and 4,4'-dihydroxybiphenyl, the naphthols, the naphthalenediols, and the like. The organic portion of the alkaline earth metal alcoholates also can be derived from organic compounds containing both alcoholic hydroxyl and phenolic hydroxyl groups. In addition, the organic portion can contain unreactive groups or groups which do not adversely affect the polymerization reaction such as alkoxy, aryloxy, aralkyloxy, alkaryloxy, thioether groups, halogen bonded to aromatic carbon, sulfones, aromatic nitro groups, amino groups, and the like.

The catalytic activity of the alkaline earth metal alcoholate can be enhanced upon moderate exposure of said alcoholate to carbon dioxide and water. Such exposure results in a weight increase of the alkaline earth metal alcoholate. However, no simple rule of thumb can be given for determining the optimum weight gain necessary to impart maximum catalytic activity to the alcoholate by exposure to carbon dioxide and water since the particular metal alcoholate of choice, its preparation, its surface area, the operative conditions of the polymerization reaction, etc., are influencing factors to be considered in each case. It has been observed that alkaline earth metal alcoholates in which the organic portion is derived from lower saturated aliphatic alcohols, e.g., methanol and ethanol, require less exposure (or less weight gain), than is the case when the organic portion is derived from, for example, n-hexanol, 2-butoxyethanol, alkylene glycols, and the like, to provide enhanced catalytic activity. Exposure of the preparation of calcium ethylene glycoxide (prepared in a manner similar to that set out in Example 1) to carbon dioxide substantially saturated with water vapor disclosed that the catalytic activity increased with increase in weight of said glycolate up to a weight gain of about 60 percent; thereafter the catalytic activity begin to decrease. However, even after a gain in weight of about 70 percent, the glycolate was still more active than the unexposed or untreated compound, i.e., calcium ethylene glycolate. In this particular illustration, the optimum gain in weight was ascertained to be about 45 to 60 percent.

The alkaline earth metal alcoholates can be prepared, for example, by reacting the appropriate alkaline earth metal with the desired hydroxy-containing organic compound. The preparation can be conducted in an inert or substantially inert organic diluent, e.g., dioxane, or liquid ammonia, or in an excess of the hydroxy-containing organic compound itself. It is preferred that the preparation of the alkaline earth metal alcoholates be conducted under an inert atmosphere such as butane, nitrogen, and the like. During the preparation and storage of the alkaline earth metal alcoholates, it is desirable to minimize the presence of carbon dioxide, water, and reactive gases which may come in contact with said alcoholates.

The alkaline earth metal alcoholates in which the organic portion is derived from dihydroxy-containing organic compounds, e.g., ethylene glycol, 1,2-propylene glycol, and the like, can be prepared by reacting the alkaline earth metal per se with the desired dihydroxy-containing organic compound, or, for example, alkaline earth metal methylate with the desired dihydroxy-containing organic compound, preferably in an inert organic diluent. When the latter is employed, it is desirable to heat the reaction medium to a temperature sufficient to remove (in this illustration) the methanol which is given off during the reaction between the alkaline earth metal methylate and the dihydroxy-containing organic compound. A preferred method of preparation is to react the desired dihydroxy-containing organic compound with the alkaline earth metal per se dissolved in liquid ammonia. The resulting product, is then recovered by allowing said liquid ammonia to evaporate therefrom; if desired, the recovered product then can be converted to a finely divided state such as by grinding, pulverizing and the like, under an inert atmosphere.

It should be noted that in the preparation of alkaline earth metal alcoholates such as illustrated above, the presence of the reactants in stoichiometric equivalency in the reaction mixture is not narrowly critical. As an illustration, favorable catalytic activity in products prepared by the reaction of 0.95 to 2.0 mols of ethylene glycol per mol of calcium metal was observed.

As stated previously, enhanced catalytic activity is imparted to the alkaline earth metal alcoholates by exposure to carbon dioxide and water. This can be accomplished, for example, by exposing the alcoholate to moist carbon dioxide, preferably carbon dioxide saturated with water vapor, until a weight gain of at least about 0.01 percent, preferably at least about 0.1 percent is observed.

The organometallics contemplated as a third class of catalysts in the preparation of the alkylene oxide polymers can be characterized by the following formula:

(II) 

wherein M represents a Group II metal in the Periodic Table, for example, beryllium, magnesium, calcium, strontium, barium, zinc, or cadmium; wherein $R_a$ represents a monovalent hydrocarbon radical; and wherein $R_b$ represents hydrogen, halo, a monovalent hydrocarbon radical, a secondary amino radical, or a hydrocarbyloxy radical, and the like.

The monovalent hydrocarbon radicals can be the aliphatic, aromatic, and alicyclic radicals as exemplified by alkyl, cycloalkyl, aryl, alkaryl, aralkyl, and the like. More specifically, illustrative hydrocarbon radicals include, for instance, methyl, ethyl, isopropyl, n-propyl, n-butyl, t-butyl, isobutyl, sec-butyl, amyl, hexyl, isohexyl, 2-ethylhexyl, 3, methylheptyl, the octyls, the dodecyls, the octadecyls, cyclopentyl, cyclohexyl, cycloheptyl, 2-methylcyclopentyl, 2-butylcyclohexyl, 3-methylcycloheptyl, phenyl, benzyl, ortho-, meta,- and para-tolyl, the xylyls, butylphenyl, phenethyl, phenylpropyl, phenylbutyl, naphthyl, trimethylphenyl, 9-fluorenyl, and the like. Illustrative secondary amino radicals encompass, for instance, dimethylamino, diethylamino, di-n-propylamino, N-ethylpropylamino, di-2-ethylhexylamino, N-ethyl - m - toluidino, N-propyl-2,3-xylidino, N-methylanilino, N - isopropyl - benzylamino, N-phenyl-benzylamino, N-methyl-N-naphthalamino, and the like. Among the hydrocarbyloxy radicals can be listed, for instance, alkoxy, aryloxy, cycloalkyloxy, and the like, e.g., methoxy, ethoxy, isopropoxy, n-propoxy, n-butoxy, t-butoxy, hexoxy, 2-ethylhexoxy, octoxy, decoxy, dodecoxy, octadecoxy, phenoxy, ortho-, meta-, and para-toloxy, 2-propylphenoxy, butylphenoxy, n-undecylphenoxy, 2-phenethoxy, benzyloxy, cyclopentyloxy, cyclohexyloxy, cycloheptyloxy, alkylcyclohexyloxy, and the like. The halo radicals include chloro, bromo, and iodo.

Illustrative classes of organometallic catalysts which can be employed include, for example, dialkylzinc, alkylzinc halide, alkylzinc alkoxide, dialkylberyllium, alkylberlyllium halide, dialkymagnesium, alkymagnesium halide, alkylmagnesium alkoxide, dialkylcadmium, alkylcadmium halide, diarylzinc, diarylberyllium diarylmagnesium alkylmagnesium dialkylamine, alkylcalcium halide, and the like. Specific examples of the organometallic catalysts include, among others, diethylzinc, di-n-propylzinc, di-n-butylzinc, di-2-ethylhexylzinc, diphenylzinc, n-butylzinc butoxide, octylzinc chloride, phenylzinc bromide, dimethylmagnesium, dipropylmagnesium, propylphenylmagnesium, n-butylmagnesium chloride, diphenylmagnesium, phenylmagnesium chloride, dimethylberyllium diethylberyllium, ethylcalcium iodide, dimethylcadmium, diethylcadmium, dipropylcadmium, diisobutylcadmium, diisoamylcadmium, diethylbarium, diphenylbarium, dibutylbarium, diethylstrontium, butylzinc diethylamide, ethylzinc dipropylamide, and the like.

Another class of organometallics contemplated as a fourth class of catalysts in the preparation of the copolymers can be characterized by the following formula:

(III) 

wherein M represents a Group II or III metal in the Periodic Table other than calcium, strontium or barium, for example, beryllium, magnesium, zinc, cadmium, aluminum, and the like; wherein OR is a hydrocarbyloxy radical such as an alkoxy radical preferably having up to 10 carbon atoms inclusive, more preferably 2 to 4; and wherein y is the valency of the metal M.

The hydrocarbyloxy radical of the catalysts is derived from normal, secondary, or tertiary alcohols. Representative alkoxy radicals include, among others, methoxy, ethoxy, n-propoxy, isopropoxy, n-butoxy, isobutoxy, sec-butoxy, heptoxy hexoxy, dodecoxy, octadecoxy, and the like. Illustrative organometallic catalysts include, for example, aluminum triisopropoxide, aluminum tri-t-butoxide, magnesius diisopropoxide, magnesium, di-t-butoxide, and the like.

In practice, it has been found desirable to include a promoter in the aforementioned organometallic catalysts systems. For the organometallic catalysts of Formula II, the promoted catalyst system can be a dialkyl metal of Group II of the Periodic Chart, e.g., magnesium, zinc, and the like, and a compound containing an active hydrogen. Suitable active hydrogen compounds include water, methanol, ethanol, propanol, n-butanol, phenol, 2,4-pentadione, and acetic acid. For the organometallic catalysts of Formula II, the catalyst system may be composed of an aluminum trialkoxide, e.g., aluminum triisopropoxide, and a zinc halide, such as zinc chloride, zinc bromide, and the like.

A further class of catalysts which are suitable for use in the instant invention encompasses the divalent metal amides, the divalent metal amide-alcoholates, and the modified divalent metal amide catalysts.

The preparation of the metal amides is well-known to the art. For instance, the metal hexammoniates can be prepared by reacting the appropriate metal with liquid ammonia, the resulting product being characterized by the formula $M(NH_3)_6$ wherein M can be calcium, strontium, barium, and the like. The alkaline earth metal amides can be obtained by allowing the corresponding metal hexammoniate to decompose while protecting them from reactive gases and/or vapors such as oxygen, water, and the like. The amides of zinc, cadmium, and barium can also be prepared by the reaction between potassium amide and the bromides of the appropriate metal, the reaction being carried out in liquid ammonia. The reaction of diethylzinc or diethylmagnesium with ammonia gives the corresponding metal amides and ethane as the products. The articles of Bergstrom and Fernelius[1] also disclose various methods for preparing metal amides. The metal amides effective as catalysts in the polymerization reaction are characterized by the formula $H_2N$—M—$NH_2$ wherein M is magnesium, calcium, zinc, barium, cadmium, or strontium.

The preparation and use of the divalent metal amide-alcoholates and the doubly modified divalent metal amides are disclosed respectively in U.S. Patents 2,971,988 and 2,969,402.

The catalysts are employed in catalytically significant quantities. In general, a catalyst concentration in the range of from about 0.001, and lower, to about 10, and higher, weight percent, based on the weight of total monomeric feed, is suitable. A catalyst concentration in the range of from about 0.01 to about 3.0 weight percent is preferred. A catalyst concentration in the range of from about 0.05 to about 1.0 weight percent is highly preferred. For optimum results the particular catalyst employed, the nature of the monomeric reagent(s), the operative conditions under which the polymerization reaction is conducted, and other factors will largely determine the desired catalyst concentration.

The polymerization reaction can be conducted at a temperature in the range of from about 0°, and lower, to about 200° C., and preferably from about 70° to about 150° C. As a practical matter, the choice of the particular temperature at which to effect the polymerization reaction depends, to an extent, on the nature of the diepoxide monomer and 1,2-alkylene oxide employed, the particular catalyst employed, the concentration of the catalyst, and the like.

In general, the reaction time will vary depending on the operative temperature, the nature of the diepoxide monomer and 1,2-alkylene oxide employed, the particular catalyst and the concentration employed, the use of an inert organic diluent, and other factors. The reaction time can be as short as a few hours, or shorter, in duration or it can be as long as several days. A feasible and suitable reaction period is from about 5 hours, and lower, to about 100 hours, and longer.

The polymerization reaction takes place in the liquid phase and a pressure above atmospheric may be employed to maintain the liquid phase. However, in the usual case, external pressure is unnecessary, and it is only necessary to employ a reaction vessel capable of withstanding the autogenous pressure of the reaction mixture. It is highly desirable to conduct the polymerization reaction under substantially anhydrous conditions.

In carrying out the polymerization reaction an induction period may be observed prior to the initiation of the polymerization reaction; this induction period can be as short as, or shorter than, minutes in length or it can be several hours in duration.

The copolymer can be prepared via the bulk polymerization, suspension polymerization, or the solution polymerization routes. The polymerization reaction can be carried out in the presence of an inert organic diluent such as, for example, aromatic solvents, e.g., benzene, chlorobenzene, toluene, xylene, ethylbenzene, and the like; various oxygenated organic compounds such as anisole, the dimethyl and diethyl ethers of ethylene glycol, of propylene glycol, of diethylene glycol and the like; normally-liquid saturated hydrocarbons, e.g. pentane, hexane, heptane; cycloalkanes, e.g., cyclopentane, cyclohexane, and the like.

The copolymers have a reduced viscosity of at least 0.5 more preferably at least 1.0 and still more preferably from about 2 to about 30, and higher, as measured at a concentration of 0.2 gram of said copolymer in 100 milliliters of acetonitrile or suitable solvent at 30° C. The reduced viscosity values of the copolymers were determined at a concentration of 0.2 gram of the copolymer per 100 milliliters of acetonitrile at 30° C., unless indicated otherwise.

The vinyl halide resins which can be satisfactorily plasticized and stabilized by the alkylene oxide polymers hereinbefore disclosed can be any polymeric compound prepared from monomers containing the vinyl group

as well as mixtures with other vinyl monomers to produce homopolymers, copolymers, terpolymers, and the like. For simplification, the term "polymer" as used in reference to the vinyl halide resins includes the homopolymers as well as the polymers produced by the interpolymerization of a vinyl halide with one or more other polymerizable vinyl monomers; and the term "polymerization" includes the polymerization of a single monomer to produce a homopolymer as well as the polymerization of a mixture of two or more vinyl monomers to produce copolymers, terpolymers, etc. Illustrative of the vinyl halide monomers which can be polymerized or copolymerized with other vinyl monomers are vinyl chloride, vinylidene chloride, vinyl fluoride, and the like. Illustrative of the vinyl monomers which can be copolymerized with the vinyl halides to high molecular weight polymers are acrylic acid and its derivatives, such as acrylonitrile, methacrylonitrile, acrylamide, methacryl amide, methacrylic acid, methyl methacrylate, ethyl methacrylate, ethyl acrylate, and the like; the vinyl esters such as vinyl acetate, vinyl butyrate, vinyl benzoate, and the like; the vinyl ketones such as isopropenyl methyl ketone, vinyl phenyl ketone, vinyl methyl ketone, alpha-chlorovinyl methyl ketone, and the like; the vinyl thioethers such as vinyl ethyl sulfide, vinyl p-tolyl sulfide, divinyl sulfide, and the like. Other monomers or monomer mixtures which are capable of copolymerization with vinyl halides, divinyl sulfone, vinyl ethyl sulfone, vinyl ethyl sulfoxide, vinyl sulfonic acid, sodium vinyl sulfonate, vinyl sulfonamide, vinyl pyridine, N-vinyl pyrollidone, N-vinyl carbazole, and the like. It will be and is obvious to a person skilled in the art that the concentrations of the monomers in the polymerizable mixture can be varied from a mixture consisting entirely of one monomer to mixtures consisting of two or more monomers in which the concentration of each monomer can be varied to suit the individual's purpose.

Other suitable polymers are acrylonitrile/vinylidene

---

[1] Chem. Revs. 12, 43 (1933); Chem. Revs. 20, 413 (1937).

chloride copolymers, vinyl chloride/vinyl acetate copolymer, acrylonitrile/vinyl chloride copolymer, acrylonitrile/vinyl acetate copolymer, acrylonitrile/vinyl chloride/vinylidene chloride terpolymer, and the like.

In general, any one of several methods of mixing and fluxing can be utilized in the preparation of the plasticized compositions of this invention. For instance, the vinyl resin and plasticizer can be intimately dispersed by dry blending, e.g., stirring or tumbling and the admixture fluxed into a continuous sheet on a steam heated roll mill or molded to give the desired product. Other methods of mixing and fluxing, such as a Banbury cycle followed by calendering can also employed.

In practice, the alkylene oxide polymers will be employed in a plasticizing amount. By the term "plasticizing amount" is meant that quantity of polymer which will appreciably increase the flexibility, workability or distensibility of the material with which it is admixed. For example, it has been found that a concentration of polymer in the vinyl resin within the range of from about 1 to about 98 weight percent, based on the weight of resin, and more preferably from about 2 to about 50 weight percent, appreciably increases the flexibility and workability of the resin. Concentrations above and below the aforesaid ranges can equally as well be employed. Thus, as little as one part of the alkylene oxide polymer to 100 parts of the vinyl resin has a measurable effect on the stiffness of the mixture while the upper limit would be determined by the degree of flexibility that the end use might require.

The instant invention also contemplates the use of a stabilizing amount of one of the aforementioned alkylene oxide polymers whereby the vinyl resin is stabilized against substantial molecular weight degradation. By the term "stabilizing amount" as herein used, is meant that quantity of polymer which when added to the system containing the vinyl resin, in particular poly(vinyl halides), is sufficient to effectively stabilize the resin against substantial molecular weight degradation. The term also expresses the amount of polymer necessary to reduce the loss of viscosity of the resin being stabilized, during storage, in transit, and the like, as compared with the corresponding resin not containing therein the polymers of this invention. The art is well apprised of the technique of stabilizing organic compounds, and in general, the amount of stabilizer employed will be governed, to an extent, by the reduced viscosity of the vinyl resin by the particular polymer employed as stabilizer, the choice of the inert vehicle, and by other considerations.

In general, the concentration of alkylene oxide polymer is not narrowly critical and can range from about 0.001 weight percent to about 10 weight percent, and higher, based on the total weight of solid resin. A concentration of from about 0.01 to about 5 weight percent is effective while a polymer concentration of from about 0.05 to about 2.0 weight percent is preferred. However, the optimum concentration of polymer depends, to a great extent, upon other variables.

Inasmuch as the amount of alkylene oxide polymer employed to plasticize the vinyl resin will be at least as great as, and in the majority of cases substantially greater than, the amount needed to stabilize the resin, the use of a "plasticizing amount" of the alkylene oxide polymer will inherently include a "stabilizing amount." For instance, stabilization against heat and light degradation can be achieved by the addition of as little as 0.001 weight percent of an alkylene oxide polymer, based on the weight of the vinyl resin. Thus, when plasticizing amounts of the alkylene oxide polymer are employed, a stabilization amount will inherently be present.

As plasticizers, the aforesaid polymers impart outstanding and unexpected properties and characteristics to vinyl resins, particularly vinyl chloride resins. The incorporation of the alkylene oxide polymers into vinyl resins results in a plasticized composition which has low processing temperature requirements as well as heat and light stability. The novel plasticized polymeric compositions of this invention also have the remarkable ability to resist shattering at low temperatures and in this respect they are markedly superior to similar compositions plasticized with commercial plasticizers. In addition, the plasticized compositions exhibit very low volatility and extremely high resistance to oil and water extraction. Moreover, films prepared from the vinyl resins which are plasticized with the alkylene oxide polymers are tougher and more extensible than films prepared from the same vinyl resins which are plasticized with conventional plasticizers, e.g., dioctyl phthalate, or low molecular weight polyester. It should be borne in mind that the above enumerated unexpected and unobvious results which are achieved by virtue of the employment of the alkylene oxide polymers in various fields of applications are also manifest when compared to the use of a separate plasticizer and low molecular weight epoxide stabilizer in the same fields of applications under substantially similar conditions.

Due to their excellent compatibility the polymers can be employed as plasticizers in vinyl applications which demand good low-temperature performance. Their low volatility enables vinyls to maintain their properties over extended periods of time. Moreover, the plasticizers provide a marked improvement in the drape, softness and hand of vinyl films, sheeting, and other fabrics. Additionally, the low degree of oil and water extraction and non-migratory characteristics render these plasticizers useful in coated fabrics for automobile upholstery, vinyl outerwear, vinyl foams, insulating medium for wire and cable, and other vinyl products.

A particularly unique embodiment of the present invention encompasses the preparation of microporous plastics, i.e., plastic films and other articles composed of one or more vinyl resins which are honeycombed with a multitude of tiny holes. Microporous plastic films have the ability to transmit air and vapors while acting as a barrier for liquids, e.g., water. Hence, they are useful as rainwear, filters, bandages, in water purification equipment, blood oxygenators and the like.

The microporous plastics of this embodiment of the present invention are conveniently prepared from the aforementioned vinyl resin compositions which have incorporated therein an ethylene oxide homopolymer or an ethylene oxide copolymer comprised of at least 50 weight percent ethylene oxide chemically combined therein. The resin is intimately mixed with the ethylene oxide polymer and the mixture shaped by the usual techniques employed in the plastics art. Inasmuch as the ethylene oxide polymer is water soluble and the resin water insoluble it is possible to dissolve away the polymer with either hot or cold water or appropriate solvent leaving a porous resin. The degree of porosity in the resin will be determined, in part, by the ratio of ethylene oxide polymer to resin and the desired end use of the product. Moreover, the size of the holes in the resin will depend on the particle size of the ethylene oxide polymer. In practice, the hole size can range from as low as 1 micron, and lower, to about 200 microns, and higher depending upon the polymer granule size, blending and calendering means, as well as other considerations.

In the following examples, various high molecular weight alkylene oxide polymers were evaluated as plasticizers and stabilizers for vinyl halide resins. In reporting the physical properties of the plasticized and stabilized vinyl resin compositions certain symbols and abbreviations are employed. These symbols, abbreviations and various tests are defined as follows:

(1) Reduced viscosity ($I_R$)—Obtained by dividing the specific viscosity by the concentration of the polymer in solution, the concentration being measured in grams of polymer per 100 milliliters of solvent. The specific viscosity is obtained by dividing the difference between the viscosity of the solution and the viscosity of the pure solvent by the viscosity of the pure solvent. The reduced viscosity value of the alkylene oxide polymers were determined at a concentration of 0.2 gram of the polymer per 100 milliliters of acetonitrile at 30° C. The reduced viscosity of the poly(vinyl halides), unless otherwise indicated, were determined at a concentration of 0.2 gram per 100 milliliters of cyclohexanone at 20° C.

(2) Brittle temperature—Low temperature impact measurement as determined in accordance with A.S.T.M. Method D746–55T.

(3) Heat distortion—Determined in accordance with A.S.T.M. Method D648–45T and recorded in degrees centigrade under a 264 pounds per square inch load.

(4) Izod-impact strength—Determined in accordance with A.S.T.M. Method D256–56 Method A.

(5) Melt index—Determined in accordance with A.S.T.M. Method D1238–57T employing a weight of 43 pounds per square inch.

(6) Flow rate—Determined under the same conditions employed for measuring melt index with the exception that the weight employed was 205.4 pounds per square inch.

(7) Color—Measured in percentage of blue light reflectance (BLR) by a Photovolt Reflectance Meter, Model 610, using a Wratten C–5 blue filter. Specimen is mounted on a white background which reflects 100 percent of incident beam of light.

(8) Durometer A hardness—Determined in accordance with A.S.T.M. Method D676–49T.

The following examples are illustrative:

PREPARATION OF POLYMERIZATION CATALYST

Example 1

Calcium metal (20 grams) was dissolved in 1500 milliliters of liquid ammonia. To the resulting solution there was slowly added a solution of 29.4 grams of ethylene glycol in 400 milliliters of liquid ammonia under continuous stirring. Subsequently, the ammonia was allowed to weather off for a period of 16 to 18 hours until a dry, grayish-white product remained. The resulting product, calcium glycoxide, was pulversized to a finely divided powdery state under a nitrogen atmosphere, and subsequently, this powdery product was divided into several portions. Each portion except the control was individually placed into a desiccator and moist carbon dioxide, generated by bubbling carbon dioxide through a water bubbler, was introduced into the desiccator (maintained at approximately 25° C.) for varying periods of time. These "exposure activated" calcium glycoxides were catalytically active. Other pertinent data are disclosed in Table I below:

TABLE I

| Sample Number | Catalyst [1] | Exposure Time, Hours | Weight Percent Gain [2] |
|---|---|---|---|
| 1 | Calcium glycoxide | 0.00 | |
| 2 | ----do---- | 0.08 | 6.3 |
| 3 | ----do---- | 0.17 | 13.6 |
| 4 | ----do---- | 0.5 | 22.6 |
| 5 | ----do---- | 1.0 | 26.0 |
| 6 | ----do---- | 3.0 | 57.8 |
| 7 | ----do---- | 4.0 | 75.0 |

[1] Exposed to moist carbon dioxide as indicated.
[2] Based on the weight of calcium glycoxide prior to exposure to moist carbon dioxide.

Example 2

Strontium carbonate was precipitated by bubbling carbon dioxide into an aqueous solution of strontium hydroxide octahydrate. The precipitated strontium carbonate was recovered by filtration and subsequently, various samples thereof were heated at different temperatures. One sample was heated at 55° C. until the strontium carbonate contained about 1.5 weight percent sorbed water; a second sample was heated at 120° C. until the strontium carbonate contained about 1.0 weight percent sorbed water; and a third sample was heated at 200° C. until the strontium carbonate contained about 0.5 weight percent sorbed water. All three of these samples were observed to be active polymerization catalysts.

On continued heating the said three strontium carbonate samples above 250° C., the catalytic activity thereof was progressively reduced. On heating the samples at a temperature of 350° to 400° C. for 24 to 48 hours, i.e., to a point wherein the sorbed water was essentially nil, the strontium carbonate samples became essentially inactive as catalysts.

PREPARATION OF ALKYLENE OXIDE-DIEPOXIDE COPOLYMERS

In Examples 3 to 10 below, the procedure employed to prepare the copolymers was as follows: A 9-inch Pyrex tube 22 millimeters in diameter was sealed at one end, the other end of the tube was fitted with a 3-inch piece of 8 millimeter Pyrex tubing. The tube was cleaned, dried and flushed with dry nitrogen. Thereafter a weighed quantity of the indicated catalyst was introduced into the tube. The monomeric mixture was then charged to the tube in a "dry box" containing a nitrogen atmosphere. The tube was then closed with a rubber cap, cooled in Dry Ice-acetone bath, and sealed under the vacuum thus obtained. Thereafter the sealed tube was inserted into an aluminum block which was gently agitated by rocking at the desired operating temperature for a given period of time. At the end of the indicated period the tube was broken open and the reaction product placed in a vacuum, e.g. about 2 to about 15 millimeters of mercury at from about 30° C. to about 45° C., until dried. In some instances 1 percent by weight, based on the weight of the charged compositions, of an antioxidant, such as 2,2′-methylene bis(4-methyl-6-tertiary butyl phenol), was added to the copolymer. In other examples, the polymerization reaction was conducted in a two-liter, stainless steel, stirred autoclave.

Example 3

Ethylene oxide (9.5 grams), 2,3-epoxypropyl, 2,3-epoxy-2-ethyl hexanoate (0.5 gram), toluene (20 grams), and calcium glycoxide (0.03 gram) were sealed in a Pyrex test tube as indicated above and agitated in a water bath at 90° C. for 66 hours. The yield was 10 grams of copolymer which had a reduced viscosity value of 0.88 in acetonitrile. The copolymer was found to contain approximately 5.8 percent 2,3-epoxypropyl 2,3-epoxy-2-ethyl hexanoate by titration for oxirane oxygen.

Example 4

Ethylene oxide (8.5 grams), 2,3-epoxypropyl 2,3-epoxy-2-ethyl hexanoate (1.5 grams), toluene (20 grams), and calcium glycoxide (0.03 gram) were sealed in a Pyrex test tube and agitated in a water bath at 90° C. for 66 hours. The yield was 10 grams of copolymer which had a reduced viscosity value of 0.28 in acetonitrile. The copolymer was found to contain approximately 5.8 percent 2,3-epoxypropyl 2,3-epoxy-2-ethyl hexanoate by titration for oxirane oxygen.

Example 5

Ethylene oxide (9.5 grams), octadecadiene dioxide (0.5 gram), toluene (20 grams), and calcium glycoxide (0.03 gram) were sealed in a Pyrex test tube and agitated in a water bath at 90° C. for 66 hours. The yield was 10 grams of copolymer which had a reduced viscosity value of 2.02 in acetonitrile. The copolymer was found to contain approximately 6.7 percent octadecadiene dioxide by titration for oxirane oxygen.

Example 6

Ethylene oxide (8.5 grams), octadecadiene dioxide (1.5 grams), toluene (20 grams), and calcium glycoxide (0.03 gram) were sealed in a Pyrex test tube and agitated in a water bath at 90° C. for 66 hours. The yield obtained represented 100 percent conversion of the monomeric starting materials. The reduced viscosity value of the copolymer was 1.7 in acetonitrile. The copolymer was found to contain approximately 21 percent octadecadiene dioxide by titration for oxirane oxygen.

*Example 7*

Ethylene oxide (3 grams), para-(2,3-epoxycyclopentyl)-phenyl glycidyl ether (3 grams), toluene (24 grams), and dibutyl zinc (0.9 gram) were sealed in a Pyrex test tube and agitated in a water bath at 90° C. for 24 hours. The yield was 5.5 grams of copolymer which had a reduced viscosity value of 6.62 in acetonitrile.

*Example 8*

Ethylene oxide (8 grams), 2,3-epoxybutyl methylglycidyl ether (2 grams), toluene (20 grams), and dibutyl zinc (0.8 gram) were sealed in a Pyrex test tube and agitated in a water bath at 90° C. for 60 hours. The yield was 6.5 grams of copolymer which had a reduced viscosity value of 1.14 in acetonitrile. The copolymer was found to contain approximately 25 percent 2,3-epoxybutyl methylglycidyl ether by titration for oxirane oxygen.

*Example 9*

Ethylene oxide (6 grams), 2,3-epoxybutyl methylglycidyl ether (4 grams), toluene (20 grams), and dibutyl zinc (0.08 gram) were sealed in a Pyrex test tube and agitated in a water bath at 90° C. for 60 hours. The yield was 9.0 grams of copolymer which had a reduced viscosity value of 0.96 in acetonitrile. The copolymer was found to contain approximately 58 percent 2,3-epoxybutyl methylglycidyl ether by titration for oxirane oxygen.

*Example 10*

Propylene oxide (7.2 grams), vinylcyclohexene dioxide (0.8 gram), toluene (18.7 grams) and dibutyl zinc (0.08 gram) were sealed in a Pyrex test tube and agitated in a water bath at 90° C. for 29 hours. The yield was 1 gram which had a reduced viscosity of 11.50 in acetonitrile. The copolymer was found to contain approximately 17.1 percent vinylcyclohexene dioxide by titration for oxirane oxygen.

*Example 11*

To a two-liter, stainless steel stirred autoclave, there were charged 274 grams of ethylene oxide, 18 grams of butane (vapor phase stabilizer for the ethylene oxide), 14.5 grams of para-(2,3-epoxybutyl)phenyl glycidyl ether, 572 grams of toluene, and 0.87 gram of exposure activated calcium glycoxide prepared in the manner set forth in Example 1 supra. The reaction mixture was stirred at 95–120° C. for approximately 41 hours. At the end of this time, the copolymer product was precipitated from the toluene solution with hexane, recovered, and dried under vacuum at 30° C. 246 grams of polymer were obtained which had a reduced viscosity of 0.83 in acetonitrile. The copolymer was found to contain approximately 4.9 percent para-(2,3-epoxybutyl)phenyl glycidyl ether by titration for oxirane oxygen.

*Example 12*

To a two-liter, stainless steel stirred autoclave, there were charged 245 grams of ethylene oxide, 16 grams of butane (vapor phase stabilizer for the ethylene oxide), 43.4 grams of para-(2,3-epoxybutyl)phenyl glycidyl ether, 572 grams of toluene, and 0.87 gram of exposure activated calcium glycoxide prepared in the manner set forth in Example 1 supra. The reaction mixture was stirred at 79–114° C. for approximately 46 hours. At the end of this time, the copolymer product was precipitated from the toluene solution with hexane, recovered, and dried under vacuum at 30° C. 216 grams of polymer were obtained which had a reduced viscosity of 1.25 in acetonitrile. The copolymer was found to contain approximately 11.6 percent para-(2,3-epoxybutyl)phenyl glycidyl ether by titration for oxirane oxygen.

*Example 13*

To a two-liter, stainless steel stirred autoclave, there were charged 256 grams of ethylene oxide, 18 grams of butane (vapor phase stabilizer for the ethylene oxide), 14.5 grams of 2,3-epoxypropyl 2,3-epoxybutyl ether, 572 grams of toluene, and 0.87 gram of exposure activated calcium glycoxide prepared in the manner set forth in Example 1 supra. The reaction mixture was stirred at 105–117° C. for approximately 24 hours. At the end of this time, the copolymer product was precipitated from the toluene solution with hexane, recovered, and dried under vacuum at 30° C. 242 grams of polymer were obtained which had a reduced viscosity of 1.03 in acetonitrile. The copolymer was found to contain approximately 2.1 percent 2,3-epoxypropyl 2,3-epoxybutyl ether by titration for oxirane oxygen.

*Examples 14–22*

In a manner similar to that employed in Examples 11–13 various diepoxide monomers were copolymerized with ethylene oxide in the presence of exposure-activated calcium glycoxide catalyst. The total monomer charge was introduced into a stirred autoclave containing about 600 grams of toluene and catalyst. The autoclave was heated to 90° C. and the polymerization allowed to run for 20–48 hours. The resin was then precipitated in hexane and dried in a vacuum oven at 30° C. The proportions of alkylene oxide and diepoxide monomer employed, as well as other pertinent data are set forth in Tables II and III below. In Examples 14, 16, 18, 19 and 21 the catalyst concentration was 0.5 weight percent based on the total monomer charge, while in Examples 15, 17, 20 and 22, 0.3 weight percent was employed.

TABLE II.—COPOLYMERIZATION OF ETHYLENE OXIDE AND VINYLCYCLOHEXENE DIOXIDE

| Example | Charged Composition in Weight Percent | Grams Charged | Grams Yield | Polymerization time at 110° C. in hours | Reduced Viscosity | Percent [1] Diepoxide Monomer |
|---|---|---|---|---|---|---|
| 14 | Ethylene oxide, 95; vinylcyclohexene dioxide, 5. | 290 | 76 | 18 | 0.7 | 4.2 |
| 15 | Ethylene oxide, 95; vinylcyclohexene dioxide, 5. | 289 | 94 | 27 | 0.5 | 2.0 |
| 16 | Ethylene oxide, 85; vinylcyclohexene dioxide, 15. | 287 | 46 | 24 | 0.4 |  |
| 17 | Ethylene oxide, 85; vinylcyclohexene dioxide, 15. | 272 | 217 | 42 | 1.0 |  |
| 18 | Ethylene oxide, 75; vinylcyclohexene dioxide, 25. | 289 | 237 | 22 | 0.6 | 14.9 |

[1] Based on analysis of copolymer for oxirane oxygen content.

TABLE III.—COPOLYMERIZATION OF ETHYLENE OXIDE AND DIPENTENE DIOXIDE

| Example | Charged Composition In Weight Percent | Grams Charged | Grams Yield | Polymerization time at 110° C. in hours | Reduced Viscosity | Percent Di-epoxide Monomer [1] |
|---|---|---|---|---|---|---|
| 19 | Ethylene oxide, 95; dipentene dioxide, 5 | 289 | 268 | 17 | 0.5 | |
| 20 | Ethylene oxide, 95; dipentene dioxide, 5 | 289 | 199 | 17 | 1.2 | .13 Oxirane. |
| 21 | Ethylene oxide, 85; dipentene dioxide, 15 | 287 | 271 | 19 | 0.6 | |
| 22 | Ethylene oxide, 85; dipentene dioxide, 15 | 288 | 208 | 42 | 0.3 | |

[1] Based on analysis of copolymer for oxirane oxygen content.

PREPARATION OF PLASTICIZED AND STABILIZED VINYL RESIN COMPOSITIONS

Example 23

Ninety parts of poly(vinyl chloride) having a reduced viscosity in cyclohexanone of 0.75 were milled on a two-roll mill for five minutes at 165° C. with 10 parts of poly(ethylene oxide) having a reduced viscosity in acetonitrile of at least 0.5. This composition processed more easily than ordinary poly(vinyl chloride) which contained no plasticizer as evidenced by an increase in flow index. The milled compositions were then molded at 175° C. and evaluated for their physical properties. The data obtained are set forth in Table IV below:

TABLE IV.—PHYSICAL PROPERTIES OF PLASTICIZED AND UNPLASTICIZED POLY(VINYL CHLORIDE)

| Test | Unplasticized Composition | Plasticized Composition |
|---|---|---|
| Heat Distortion [1] | 66 | 72 |
| Izod-Impact Strength [2] | 0.8 | 0.5 |
| Durometer Hardness D | 76 | 83 |
| Color [3] | 17 | 15 |

[1] In ° C. at 264 pounds per square inch.
[2] In foot pounds.
[3] Percent BLR.

Examples 24-27

Milled compositions were prepared in a manner similar to that employed in the previous example. The composition contained, respectively, 100, 95, 90 and 85 parts of poly(vinyl chloride) and 5, 10 and 15 parts of an ethylene oxide copolymer. The poly(vinyl chloride) had a reduced viscosity in cyclohexanone of 0.75, while the ethylene oxide copolymer had a reduced viscosity in acetonitrile of 1.04 and was prepared by polymerizing a mixture containing 85 weight percent ethylene oxide and 15 weight percent vinylcyclohexene dioxide. The milled compositions containing the ethylene oxide copolymer showed a definite ease of processing over the unplasticized poly(vinyl chloride) as evidenced by an increase in flow index. The results of the test are set forth in Table V below:

TABLE V.—FLOW INDEX OF POLY(VINYL CHLORIDE) PLASTICIZED WITH AN ETHYLENE OXIDE COPOLYMER

| Example | Parts of Poly(Vinyl Chloride) | Parts of Ethylene Oxide Copolymer | Flow Index | | |
|---|---|---|---|---|---|
| | | | 150° C. | 175° C. | 190° C. |
| 24 | 100 | | | | 17.4 |
| 25 | 95 | 5 | 0.0 | 0.0 | 42 |
| 26 | 90 | 10 | 0.0 | 12.6 | |
| 27 | 85 | 15 | 67 | | |

Example 28

Eighty-five parts of a copolymer of vinyl chloride-vinyl acetate having a reduced viscosity of 0.56 were milled for five minutes at 115° C. with 15 parts of an ethylene oxide copolymer, 85 percent ethylene oxide and 15 percent vinylcyclohexene dioxide, reduced viscosity at 0.2 percent concentration in acetonitrile at 30° C. of 1.04. A sample of this material was molded at 120–140° C. and evaluated for its physical properties. The results obtained are set forth in Table VI below:

TABLE VI.—PHYSICAL PROPERTIES OF PLASTICIZED VINYL CHLORIDE-VINYL ACETATE COPOLYMER

| Test | Plasticized Copolymer |
|---|---|
| Heat-Distortion [1] | 40 |
| Izod-Impact Strength [2] | 0.3 |
| Durometer Hardness D | 71 |
| Color [3] | 16 |
| Melt Index [4] | 28 |

[1] In ° C. at 264 pounds per square inch.
[2] In foot pounds.
[3] Percent BLR.
[4] Measured in milligrams per minute at 190° C. and 43.1 pounds per square inch.

Examples 29–33

A sample of poly(vinyl fluoride) having a reduced viscosity of 1.4 was blended with varying amounts of poly(ethylene oxide) by mixing in a Waring Blendor for a few minutes. In one case poly(ethylene oxide) having a molecular weight of from 380 to 420 and sold under the trademark "Carbowax" was blended with poly(vinyl fluoride) by mixing thoroughly with a spatula. The physical properties of the blends are given in Table VII. In addition the rate of extrusion of these blends is given along with conditions necessary to maintain continuous extrusion through a small orifice (about ⅛ inch diameter).

TABLE VII.—PHYSICAL PROPERTIES OF PLASTICIZED POLY(VINYL FLUORIDE)

| Property | Example | | | | |
|---|---|---|---|---|---|
| | 29 | 30 | 31 | 32 | 33 |
| Percent Poly(ethylene oxide). | 0 | 2.0 | 4.6 | 20 | 0. |
| Percent Carbowax | 0 | | | | 4.6. |
| Tensile Strength (p.s.i.) | 4,727 | 3,830 | 3,612 | 808 | 4,041. |
| Stiffness Modulus | 173,000 | 162,000 | 160,000 | 105,000 | 124,000. |
| $T_2$, ° C | 216 | | 203 | | 209. |
| $T_3$, ° C | 203 | | 196 | | 198. |
| $T_4$, ° C | 158 | | 154 | | 148. |
| $T_5$, ° C | 59 | | 45 | | 31. |
| Description of extrusion of resin through ⅛" orifice under specified temperature and pressure. | Smooth flow, but very slow at 225° C. at 71,000 p.s.i. Discolored to a brown resin. | Smooth flow at 210° C. at 71,000 p.s.i. | Smooth flow at moderate rate at 220° C. at about 35–40,000 p.s.i. Somewhat weak but little discoloration. | | Very smooth fast flow at 220° C. at 35–40,000 p.s.i.; clear specimen shows almost no discoloration. |

Although the invention has been illustrated by the preceding examples, the invention is not to be construed as limited to the materials employed therein, but rather, the invention encompasses the generic invention as hereinbefore disclosed. Various modifications and embodiments of this invention can be made without departing from the spirit and scope thereof.

What is claimed is:

1. A plasticized composition comprising a vinyl halide resin and a plasticizing amount of a solid, high molecular weight, linear copolymer having pendant vic-epoxy groups, said copolymer comprising, in copolymerized form, a lower 1,2-alkylene oxide and a diepoxide monomer having an internal and a terminal vic-epoxy group, the copolymerization being effected through the more reactive vic-epoxy group of said monomer.

2. A plasticized composition comprising a vinyl halide resin and a plasticizing amount of a solid, high molecular weight, linear copolymer of a lower 1,2-alkylene oxide in copolymerized form with a diepoxide monomer of the formula:

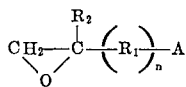

wherein $R_2$ represents a member selected from the group consisting of hydrogen and lower alkyl; $R_1$ represents a divalent saturated aliphatic hydrocarbon radical; $n$ is an integer selected from the group consisting of zero and one; and A represents a vic-epoxy containing member selected from the group consisting of epoxyalkyl, epoxyalkoxy, epoxyacyloxy, epoxycycloalkyl, alkylepoxycycloalkyl, epoxyalkylcycloalkyl epoxycycloalkoxy, epoxycycloalkylalkoxy, epoxycycloalkylaryloxy, epoxyalkylaryloxy, epoxyalkylaryl and the unit

wherein $R_3$ is selected from the group consisting of epoxyalkyl and epoxycycloalkylalkyl, with the proviso that the vic-epoxy group in A is in an internal position, said copolymer having pendant vic-epoxy groups and resulting from the reaction through the epoxy group of said 1,2-alkylene oxide and the more reactive vic-epoxy group of said diepoxide monomer.

3. A plasticized composition comprising a vinyl halide resin and a plasticizing amount of a solid, high molecular weight, linear copolymer having pendant vic-epoxy groups, said copolymer comprising, in copolymerized form, a lower 1,2-alkylene oxide and a diepoxyalkane having one internal vic-epoxy group, the copolymerization being effected through the more reactive vic-epoxy group of said diepoxyalkane.

4. A plasticized composition comprising a vinyl halide resin and a plasticizing amount of a solid, high molecular weight, linear copolymer having pendant vic-epoxy groups, said copolymer comprising in copolymerized form, a lower 1,2-alkylene oxide and a vic-epoxyalkyl-vic-epoxycycloalkane, the copolymerization being effected through the more reactive vic-epoxy group of said vic-epoxyalkyl-vic-epoxycycloalkane.

5. A plasticized composition comprising a vinyl halide resin and a plasticizing amount of a solid, high molecular weight, linear copolymer having pendant vic-epoxy groups, said copolymer comprising, in copolymerized form, a lower 1,2-alkylene oxide and a vic-epoxyalkyl vic-epoxyalkanoate having one internal vic-epoxy group, the copolymerization being effected through the more reactive vic-epoxy group of said epoxyalkyl epoxyalkanoate.

6. A plasticized composition comprising a vinyl halide resin and a plasticizing amount of a solid, high molecular weight, linear copolymer having pendant vic-epoxy groups, said copolymer comprising, in copolymerized form, a lower 1,2-alkylene oxide and a diepoxyalkyl ether having one internal vic-epoxy group, the copolymerization being effected through the more reactive vic-epoxy group of said diepoxyalkyl ether.

7. A plasticized composition comprising a vinyl halide resin and a plasticizing amount of a solid, high molecular weight, linear copolymer having pendant vic-epoxy groups, said copolymer comprising, in copolymerized form, a lower 1,2-alkylene oxide and a vic-epoxyalkylaryl vic-epoxyalkyl ether having one internal vic-epoxy group, the copolymerization being effected through the more reactive vic-epoxy group of said vic-epoxyalkylaryl vic-epoxyalkyl ether.

8. A plasticized composition comprising a vinyl halide resin and a plasticizing amount of a solid, high molecular weight, linear copolymer having pendant vic-epoxy groups, said copolymer comprising, in copolymerized form, a lower 1,2-alkylene oxide and a vic-epoxycycloalkylaryl vic-epoxyalkyl ether having one internal vic-epoxy group, the copolymerization being effected through the more reactive vic-epoxy group of said vic-epoxycycloalkylaryl vic-epoxyalkyl ether.

9. A plasticized composition comprising a vinyl halide resin and a plasticizing amount of a solid, high molecular weight, linear copolymer containing chemically combined therein a major proportion by weight of ethylene oxide and a minor proportion by weight of a diepoxide monomer having an internal and a terminal vic-epoxy group.

10. A plasticized composition comprising a vinyl halide resin and a plasticizing amount of a solid, high molecular weight, linear copolymer having pendant vic-epoxy groups, said copolymer comprising, in copolymerized form, a major proportion by weight of ethylene oxide and a minor proportion by weight of 2,3-epoxypropyl 2,3-epoxy-2-ethyl hexanoate.

11. A plasticized composition comprising a vinyl halide resin and a plasticizing amount of a solid, high molecular weight, linear copolymer having pendant vic-epoxy groups, said copolymer comprising, in copolymerized form, a major proportion by weight of ethylene oxide and a minor proportion by weight of 1,4-octadiene dioxide.

12. A plasticized composition comprising a vinyl halide resin and a plasticizing amount of a solid, high molecular weight, linear copolymer having pendant vic-epoxy groups, said copolymer comprising, in copolymerized form, a major proportion by weight of ethylene oxide and a minor proportion by weight of para-(2,3-epoxycyclopentyl)phenyl glycidyl ether.

13. A plasticized composition comprising a vinyl halide resin and a plasticizing amount of a solid, high molecular weight, linear copolymer having pendant vic-epoxy groups, said copolymer comprising, in copolymerized form, a major proportion by weight of ethylene oxide and a minor proportion by weight of 2,3-epoxybutyl methylglycidyl ether.

14. A plasticized composition comprising a vinyl halide resin and a plasticizing amount of a solid, high molecular weight, linear copolymer having pendant vic-epoxy groups, said copolymer comprising, in copolymerized form, a major proportion by weight of ethylene oxide and a minor proportion by weight of vinylcyclohexene dioxide.

15. A process for plasticizing a vinyl resin which comprises admixing with said vinyl resin a plasticizing amount of a solid, high molecular weight, linear copolymer having pendant vic-epoxy groups, said copolymer comprising in copolymerized form, a lower 1,2-alkylene oxide and a diepoxide monomer having an internal and terminal vic-epoxy group, the copolymerization being effected through the more reactive vic-epoxy group of said monomer.

(References on following page)

References Cited by the Examiner

UNITED STATES PATENTS 3,135,705  6/1964  Vandenberg ---------- 260—2

FOREIGN PATENTS 474,774  6/1951  Canada.

OTHER REFERENCES

Lee et al.: Epoxy Resins, McGraw-Hill, N.Y., 1957 (page 159).

MURRAY TILLMAN, *Primary Examiner.*

E. J. TROJNAR, PAUL LIEBERMAN,

*Assistant Examiners.*